US012567177B2

(12) United States Patent
Liu et al.

(10) Patent No.: US 12,567,177 B2
(45) Date of Patent: Mar. 3, 2026

(54) METHOD, ELECTRONIC DEVICE, AND COMPUTER PROGRAM PRODUCT FOR IMAGE PROCESSING

(71) Applicant: Dell Products L.P., Round Rock, TX (US)

(72) Inventors: Zhisong Liu, Shenzhen (CN); Zijia Wang, Weifang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 403 days.

(21) Appl. No.: 18/132,751

(22) Filed: Apr. 10, 2023

(65) Prior Publication Data

US 2024/0303866 A1     Sep. 12, 2024

(30) Foreign Application Priority Data

Mar. 10, 2023    (CN) .......................... 202310232036.1

(51) Int. Cl.
*G06T 9/00* (2006.01)
*G06T 3/4053* (2024.01)
(Continued)

(52) U.S. Cl.
CPC .............. *G06T 9/00* (2013.01); *G06T 3/4053* (2013.01); *G06T 5/50* (2013.01); *G06V 10/761* (2022.01); *G06T 2207/20221* (2013.01)

(58) Field of Classification Search
None
See application file for complete search history.

(56) References Cited

U.S. PATENT DOCUMENTS

2022/0101122 A1* 3/2022 Vahdat ................... G06N 3/045
2022/0398836 A1* 12/2022 Zheng ................... G06V 10/85
(Continued)

OTHER PUBLICATIONS

Gao et al., "Learning Generative ConvNets via Multi-grid Modeling and Sampling," 2018 IEEE/CVF Conference on Computer Vision and Pattern Recognition, Salt Lake City, UT, USA, 2018, pp. 9155-9164, doi: 10.1109/CVPR.2018.00954 (Year: 2018).*
(Continued)

*Primary Examiner* — Michelle M Koeth
(74) *Attorney, Agent, or Firm* — Ryan, Mason & Lewis, LLP

(57) ABSTRACT

Illustrative embodiments of the present disclosure include a method, an electronic device, and a computer program product for image processing. The method includes extracting a first hidden vector in a first image and acquiring first grid data associated with the first image, wherein the first grid data corresponds to pixel positions of the first image. The method further includes encoding the first hidden vector to acquire first encoded data, generating first inference data based on the first grid data and the first encoded data, decoding the first inference data to generate first decoded data, and generating a second image based on the first decoded data and the first image, wherein the second image has a higher resolution than the first image. The method can continuously enhance image quality by exploring potential correlations between pixels, and can provide powerful and arbitrary super resolution processing capabilities for up sampled images.

18 Claims, 8 Drawing Sheets

200

201
Extract a first hidden vector in a first image

202
Acquire first grid data associated with the first image, wherein the first grid data corresponds to pixel positions of the first image 203
Encode the first hidden vector to acquire first encoded data 204
Generate first inference data based on the first grid data and the first encoded data 205
Decode the first inference data to generate first decoded data 206
Generate a second image based on the first decoded data and the first image, the second image having a higher resolution than the first image

(51) Int. Cl.
G06T 5/50 (2006.01)
G06V 10/74 (2022.01)

(56) References Cited

U.S. PATENT DOCUMENTS

2024/0005604 A1* 1/2024 Kreis ..................... G06T 19/20
2024/0161360 A1* 5/2024 Kumar ..................... G06T 9/00

OTHER PUBLICATIONS

Liu et al., "Enhancing Multi-Scale Implicit Learning in Image Super-Resolution with Integrated Positional Encoding," arXiv: 2112.05756v1 [eess.IV], Dec. 10, 2021, https://doi.org/10.48550/arXiv.2112.05756 (Year: 2021).*

Mehrotra et al., "Predictive hierarchical table-lookup vector quantization with quadtree encoding," Proceedings of 3rd IEEE International Conference on Image Processing, Lausanne, Switzerland, 1996, pp. 407-410 vol. 3, doi: 10.1109/ICIP.1996.560517. ( Year: 1996).*

Dai et al., "Adaptive Illumination based Depth Sensing using Deep Superpixel and Soft Sampling Approximation," Feb. 22, 2022, arXiv:2103.12297v2 [cs.CV], https://doi.org/10.48550/arXiv.2103.12297 (Year: 2022).*

Zeng et al., "LION: Latent Point Diffusion Models for 3D Shape Generation," 36th Conference on Neural Information Processing Systems (NeurIPS 2022) (Year: 2022).*

C. Dong et al., "Image Super-Resolution Using Deep Convolutional Networks," IEEE Transactions on Pattern Analysis and Machine Intelligence, arXiv:1501.00092v3, Jul. 31, 2015, 14 pages.

J. Kim et al., "Accurate Image Super-Resolution Using Very Deep Convolutional Networks," IEEE Conference on Computer Vision and Pattern Recognition (CVPR), arXiv:1511.04587v2, Nov. 11, 2016, 9 pages.

W.-S. Lai et al., "Deep Laplacian Pyramid Networks for Fast and Accurate Super-Resolution," IEEE Conference on Computer Vision and Pattern Recognition (CVPR), arXiv:1704.03915v2, Oct. 9, 2017, 9 pages.

C. Ledig et al., "Photo-Realistic Single Image Super-Resolution Using a Generative Adversarial Network," IEEE Conference on Computer Vision and Pattern Recognition (CVPR), arXiv:1609.04802v5, May 25, 2017, 19 pages.

B. Lim et al., "Enhanced Deep Residual Networks for Single Image Super-Resolution," IEEE Conference on Computer Vision and Pattern Recognition (CVPR), arXiv:1707.02921v1, Jul. 10, 2017, 9 pages.

Y. Zhang et al., "Image Super-Resolution Using Very Deep Residual Channel Attention Networks," European Conference on Computer Vision, arXiv:1807.02758v2, Jul. 12, 2018, 16 pages.

Y. Zhang et al., "Residual Dense Network for Image Super-Resolution," IEEE/CVF Conference on Computer Vision and Pattern Recognition, arXiv:1802.08797v2, Mar. 27, 2018, 10 pages.

M. Haris et al., "Deep Back-Projection Networks for Single Image Super-resolution," IEEE Transactions on Pattern Analysis and Machine Intelligence, arXiv:1904.05677v2, Jun. 13, 2020, 14 pages.

Z.-S. Liu et al., "Hierarchical Back Projection Network for Image Super-Resolution," IEEE/CVF Conference on Computer Vision and Pattern Recognition, arXiv:1906.06874v2, Jun. 20, 2019, 10 pages.

Z.-S. Liu et al., "Image Super-Resolution via Attention based Back Projection Networks," IEEE/CVF Conference on Computer Vision and Pattern Recognition, arXiv:1910.04476v, Oct. 10, 2019, 9 pages.

T. Dai et al., "Second-order Attention Network for Single Image Super-Resolution," Proceedings of the IEEE Conference on Computer Vision and Pattern Recognition, Jun. 1, 2019, 10 pages.

B. Niu et al., "Single Image Super-Resolution via a Holistic Attention Network," European Conference on Computer Vision, arXiv:2008.08767v1, Aug. 20, 2020, 16 pages.

I. J. Goodfellow et al., "Generative Adversarial Nets," Advances in Neural Information Processing Systems, arXiv:1406.2661v1, Jun. 10, 2014, 9 pages.

Z. Liu et al., "Photo-Realistic Image Super-Resolution via Variational Autoencoders," IEEE Transactions on Circuits and Systems for Video Technology, vol. 31, No. 4, Apr. 2021, 15 pages.

Z.-S. Liu et al., "Reference Based Face Super-Resolution," IEEE Access, vol. 7, Sep. 23, 2019, pp. 129112-129126.

J. Engel et al., "Latent Constraints: Learning to Generate Conditionally from Unconditional Generative Models," arXiv:1711.05772v2, Dec. 21, 2017, 22 pages.

Z.-S. Liu et al., "Unsupervised Real Image Super-Resolution via Generative Variational AutoEncoder," IEEE International Conference on Computer Vision and Pattern Recognition Workshop, arXiv:2004.12811v1, Apr. 27, 2020, 10 pages.

M. Bevilacqua et al., "Low-Complexity Single-Image Super-Resolution based on Nonnegative Neighbor Embedding," Proceedings British Machine Vision Conference, Sep. 2012, p. 135.1-135.10.

R. Zeyde et al., "On Single Image Scale-Up using Sparse-Representation," Technion, Technical Report CS-2010-12, Feb. 27, 2010, 20 pages.

* cited by examiner

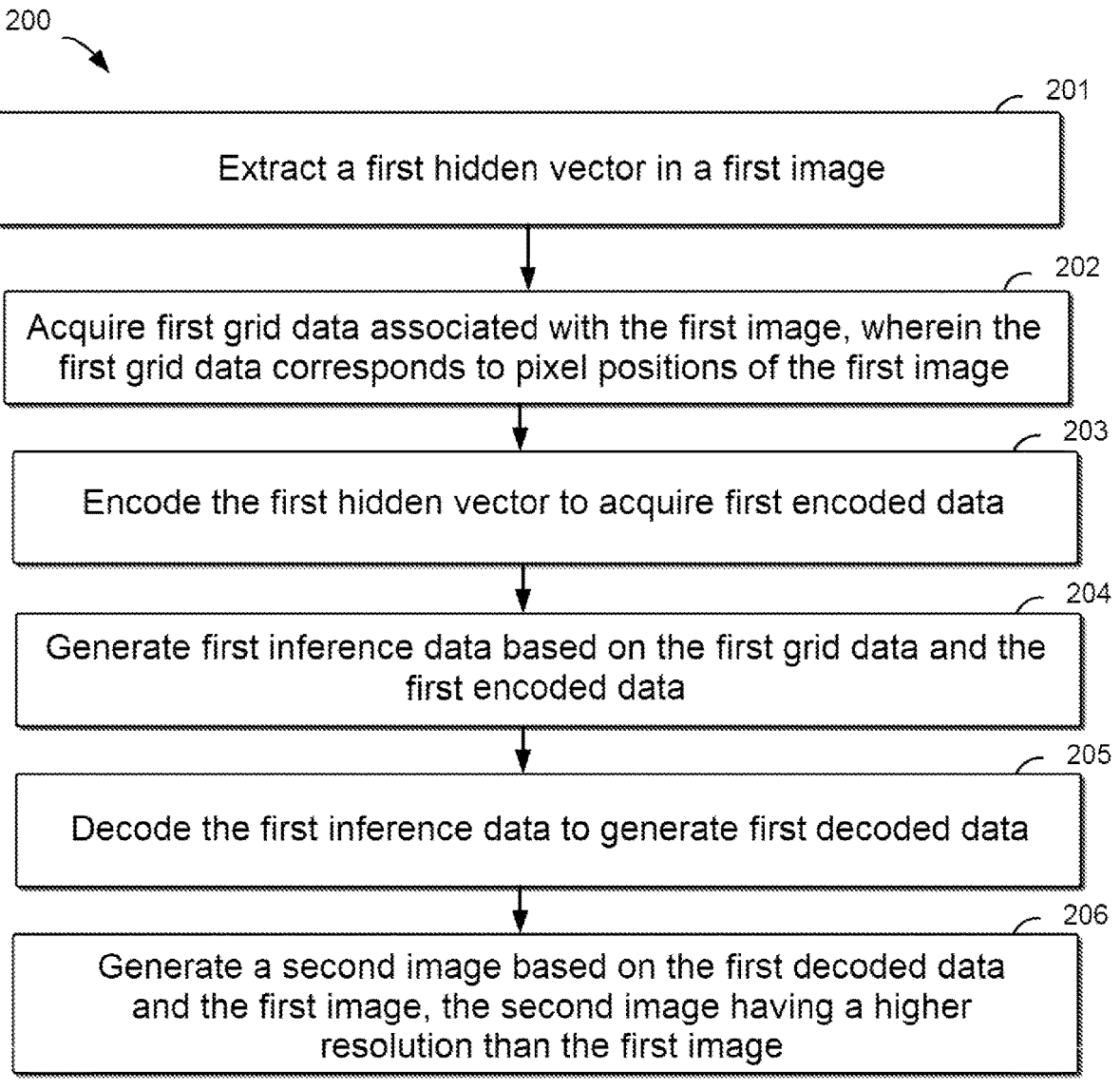

200

201

Extract a first hidden vector in a first image

202

Acquire first grid data associated with the first image, wherein the first grid data corresponds to pixel positions of the first image

203

Encode the first hidden vector to acquire first encoded data

204

Generate first inference data based on the first grid data and the first encoded data

205

Decode the first inference data to generate first decoded data

206

Generate a second image based on the first decoded data and the first image, the second image having a higher resolution than the first image

METHOD, ELECTRONIC DEVICE, AND COMPUTER PROGRAM PRODUCT FOR IMAGE PROCESSING

RELATED APPLICATION

The present application claims priority to Chinese Patent Application No. 202310232036.1, filed Mar. 10, 2023, and entitled "Method, Electronic Device, and Computer Program Product for Image Processing," which is incorporated by reference herein in its entirety.

FIELD

Embodiments of the present disclosure relate to the field of computers, and more particularly, to a method, an electronic device, and a computer program product for image processing.

BACKGROUND

Image/video super-resolution (SR) is fundamental to signal processing in computer vision. It is a cornerstone of digitization and communication. The goal is to compress abundant spatial/temporal information into a denser space without losing original quality. Given that human beings now live in an era of big data, the amount of data is growing exponentially, especially in cases where there are more high-definition devices available. For example, users often need to store their 4K images and videos in the cloud for remote access. Enterprises and digital service providers can offer customized cloud services to enable efficient data sharing. For enterprises, their need for artificial intelligence training and data analysis on big data is even more urgent. By providing easy access to high-quality big data, artificial intelligence companies or research groups are allowed to directly access the data without downloading or worrying about computing and storage costs.

SUMMARY

Embodiments of the present disclosure provide a method, an electronic device, and a computer program product for image processing.

According to a first aspect of the present disclosure, a method for image processing is provided. The method includes extracting a first hidden vector in a first image and acquiring first grid data associated with the first image, wherein the first grid data corresponds to pixel positions of the first image. The method further includes encoding the first hidden vector to acquire first encoded data, generating first inference data based on the first grid data and the first encoded data, decoding the first inference data to generate first decoded data, and generating a second image based on the first decoded data and the first image, the second image having a higher resolution than the first image.

According to a second aspect of the present disclosure, an electronic device is provided. The electronic device includes at least one processor; and a memory coupled to the at least one processor and having instructions stored therein, wherein the instructions, when executed by the at least one processor, cause the electronic device to perform actions including extracting a first hidden vector in a first image and acquiring first grid data associated with the first image, wherein the first grid data corresponds to pixel positions of the first image. The actions further include encoding the first hidden vector to acquire first encoded data, generating first inference data based on the first grid data and the first encoded data, decoding the first inference data to generate first decoded data, and generating a second image based on the first decoded data and the first image, the second image having a higher resolution than the first image.

According to a third aspect of the present disclosure, a computer program product is provided. The computer program product is tangibly stored in a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By description of example embodiments of the present disclosure, provided in more detail herein in connection with the accompanying drawings, the above and other objectives, features, and advantages of the present disclosure will become more apparent, wherein in the example embodiments of the present disclosure, the same reference numerals generally represent the same elements. In the accompanying drawings:

FIG. 2 illustrates a flow chart of a method for image processing according to an embodiment of the present disclosure;

DETAILED DESCRIPTION

Figure 1:
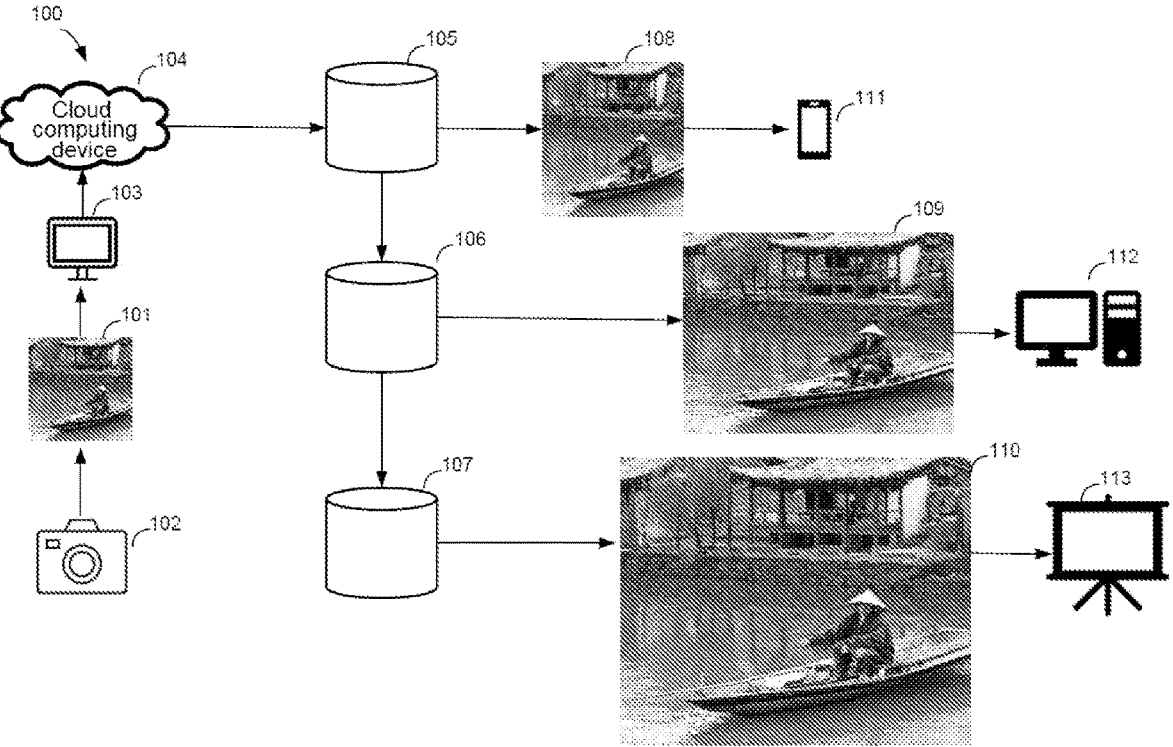
FIG. 1 illustrates a schematic diagram of an example environment in which a device and/or a method according to an embodiment of the present disclosure can be implemented.

Illustrative embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

Currently known technologies focus more on low-resolution up sampling of images, such as providing up sampling with relatively small increases in resolution, e.g., merely a 2-times increase in resolution or a 4-times increase in resolution. Current techniques cannot reconstruct images with a resolution of 4K or 8K, and for images with a resolution of 4K or 8K, it is insufficient to provide merely a 2-times or 4-times increase in resolution. In addition, current techniques are unable to reconstruct finer and high-definition details, for example, image edges and textures, hair details, and the like.

More importantly, in practical applications, it is necessary to ensure the scalability of image super-resolution. In other words, different image super-resolution solutions are required depending on different display devices, transmission distances, and network bandwidths. For example, when people watch a movie on high-speed trains, it is only required to transmit small/medium resolution images, but at a high transmission speed. On the other hand, when people watch the same movie on a laptop computer via a wired network connection, an ultra-high resolution movie with a medium transmission speed may be provided. The scalability is important for the super-resolution technology to perform adjustment in various application scenarios.

Therefore, in order to address at least the above and other potential problems, embodiments of the present disclosure provide a method, an electronic device, and a computer program product for image processing, and more specifically, relate to a Hierarchical Variational Auto Encoder (HVAE) framework for achieving scalable image super-resolution. The method includes extracting a first hidden vector in a first image and acquiring first grid data associated with the first image, wherein the first grid data corresponds to pixel positions of the first image. The method further includes encoding the first hidden vector to acquire first encoded data, generating first inference data based on the first grid data and the first encoded data, decoding the first inference data to generate first decoded data, and generating a second image based on the first decoded data and the first image, wherein the second image has a higher resolution than the first image. The method can continuously enhance image quality by exploring potential correlations between pixels. Moreover, the method can provide powerful and arbitrary super-resolution processing capabilities for up sampled images, and thus can save substantial amounts of storage space and device costs, while providing excellent image restoration quality.

Fundamental principles and a plurality of example embodiments of the present disclosure will be described in detail below with reference to the accompanying drawings. FIG. 1 illustrates a schematic diagram of an example environment 100 in which a device and/or a method according to an embodiment of the present disclosure can be implemented. It should be understood that the number, arrangement, and data transmission process of devices, images, and HVAEs shown in FIG. 1 are only illustrative. The example environment 100 may include different numbers of devices, images, and HVAEs arranged in different ways, as well as various additional elements, and the like.

FIG. 1 shows the example environment 100 that includes an original image 101, an image capture device 102, a computing device 103, a cloud computing device 104, HVAEs 105 to 107, super-resolution images 108 to 110, and terminal devices 111 to 113. In the example environment 100, the present disclosure designs an HVAE-based framework. More specifically, in order to build such a framework, the present disclosure designs a chain of VAE modules that can gradually enhance image quality by estimating higher frequency features. It simulates Markov chain Monte Carlo (MCMC) to create samples from continuous random variables, and the samples have a probability density proportional to a known function. These samples may be used for evaluating an integral on the variables as an expected value or a variance thereof.

The present disclosure uses the MCMC to model image super-resolution as a set of chains, starting with a grid point set for image feature sampling. The present disclosure repeats a random sampling process to find high-quality super-resolution image results. The method implemented according to the present disclosure can process image super-resolution with a large and scalable up sampling factor. The method, electronic device, and computer program product implemented based on the present disclosure can be deployed on a cloud server or an edge device. For the same image, when a customer views it on different devices, different hierarchical levels may be stacked for gradually up sampling the resolution to meet the requirements.

In the example environment 100, the original image 101 may include one or a plurality of images having any resolution, any content, any format type, and any number, and the present disclosure is not limited in this regard. For example, the original image 101 may have different resolutions, such as 720P, 1080P, 4K, and 8K, and the content of the image is not limited in the present disclosure.

Additionally or alternatively, the original image 101 may also have an audio, a video, or the like that is playable and has any length. For example, the original image 101 may include an image or a video stored in a computing device 103 of a user, or include an image or a video captured by a user in real time via an image capture device 102 such as a camera. The source, format, acquisition method, and image content of the original image 101 are not limited in the present disclosure. In the present disclosure, the image capture device 102 may be a device capable of converting an external optical image into a digital signal, including but not limited to a video camera, a single lens reflex camera, a video recorder, a scanner, a web camera, and the like. The present disclosure does not have any limitation in this regard.

In the example environment 100, the original image 101 may be captured by the user using the image capture device 102 and transmitted to the computing device 103. In the example environment 100, the computing device 103 may be any device that has processing computing resources or storage resources. For example, the computing device 103 may have common capabilities of receiving and sending data requests, real-time data analysis, local data storage, real-time network connectivity, and the like. The computing devices may typically include various types of devices. Examples of the computing devices may include, but are not limited to: desktop computers, laptop computers, smart phones, wearable devices, security devices, smart manufacturing devices, smart home devices, Internet of Things devices, smart cars, drones, and the like. It should be understood that although only the computing device 103 is shown in FIG. 1, it is only an example, rather than a specific limitation to the present disclosure. In the example environment 100, any number and type of devices may be included, and the present disclosure does not have any limitation in this regard.

The computing device 103 may then upload the original image 101 to a cloud computing device 104 via a network. The network may include, but is not limited to, various types of networks such as the Internet, a local area network, and a wireless network, and the present disclosure is not limited in this regard. The cloud computing device 104 is a shared pool of configurable computing resources (including but not limited to servers, processing, computing, storage, and the like) that can be easily accessed through the network. Types of services that can be provided by the cloud computing device 104 include, but are not limited to, an infrastructure as a service (IaaS), a platform as a service (PaaS), and software as a service (SaaS). IaaS may provide a service for basic resources such as hardware devices (such as a CPU, a memory, and a disk), PaaS may provide a service for platform resources such as a running environment (such as an operating system, a database, and middleware) of an application, and SaaS may provide a service for software resources such as the application itself (such as office software, a game, and a social network).

The cloud computing device 104 may further be deployed as a private cloud, a community cloud, and a hybrid cloud, among others, and the present disclosure is not limited in this regard. The cloud computing device 104 may also have characteristics such as providing computing power based on user needs, and being compatible with different software or hardware. Additionally or alternatively, any localized architecture may be used to implement the cloud computing device 104.

The cloud computing device 104 may transmit, in response to user requests from various terminal devices, such as the terminal devices 111 to 113, the super-resolution images 108 to 110 having different super-resolutions generated from the original image 101 through different levels of HVAE processing to the terminal devices 111 to 113.

For example, the original image 101 may be a low-resolution image with 640×480 pixels. In response to a user requesting to download the original image 101 by using a terminal device 111, such as a smart phone with a screen of 1024×765 pixels, in order to present a better display effect, the cloud computing device 104 may perform image super-resolution processing on the original image 101 via the HVAE 105 to obtain a super-resolution image 108 with 1024×765 pixels or higher pixels for display at the terminal device 111.

Additionally or alternatively, in some embodiments, in response to a user requesting to download the original image 101 by using a terminal device 112, such as a computer with a display screen of 1280×720 pixels, the cloud computing device 104 may perform image super-resolution processing on the original image 101 via the HVAE 106 to obtain a super resolution image 109 that also has 1280×720 pixels or higher pixels for display at the terminal device 112.

Additionally or alternatively, in some embodiments, in response to a user requesting to download the original image 101 by using a terminal device 113, such as a projector with 4096×2160 pixels, the cloud computing device 104 may perform image super-resolution processing on the original image 101 via the HVAE 107 to obtain a super-resolution image 110 that also has 4096×2160 pixels or higher pixels for display at the terminal device 113.

In the present disclosure, the HVAEs 105 to 107 are image super-resolution processing methods based on variational autoencoders (VAEs) and MCMC. The general idea is learning graphics and hidden vector features in low-resolution images, and using a plurality of grids to sample missing pixels from hidden vector features. The hidden vector features are usually distributed in smooth and continuous low-dimensional spaces. The correlation between hidden vector features and pixels may be represented by a sampling process. Based on the MCMC process, according to the implementation of the present disclosure, the sampling process may be repeated to move towards true pixel values. Standard Gaussian may be used for exploring high-frequency grid sampling to perform super-resolution processing on missing pixel information. The above process may be expressed by the following formula:

$$p(y_{0:T}|x) = p(y_T)\prod_{t=1}^{T} p_\theta(y_{t-1}|y_t, x) \tag{1}$$

wherein x represents input low-resolution image data, $y_{0:T}$ represents an expected super-resolution image, T represents the total number of sampling processes, $p(y_T)$ represents the probability of the $T^{th}$ output result, $p_\theta(y_{t-1}|y_t, x)$ represents the probability of the previous T−1 output results, and $p(y_{0:T}|x)$ represents the probability of the input data x and the intermediate super-resolution image between 0 and T. For each expected interpolation, flexible modeling of a noise adding process may be achieved through prediction $\hat{y}_\theta(y_t, t, y)\approx y_0$, $\epsilon_\theta(y_t, t, y)\approx\epsilon_0$, $s_\theta(y_t, t, x)\approx\Delta$ log $p(y_t|x)$, wherein $\epsilon_\theta(y_t, t)$ is a neural network for learning and predicting source noise, and $\epsilon_0$ determines $y_t$ from $y_0$.

Although an example of super-resolution processing of images in response to user requests from different terminal devices has been described above with reference to FIG. 1, it is understandable by those skilled in the art that the image method according to embodiments of the present disclosure may not be limited to the above scenarios, but may also be applied to any scenario that requires super-resolution processing of images as needed, and the application scenario is not limited in the present disclosure.

According to the method of embodiments of the present disclosure, in the process of super-resolution variability processing of images, image information is effectively utilized, which can greatly improve the efficiency of super-resolution variability processing, reduce the amount of computation and related configuration resources, save image processing time and network transmission bandwidth, and can also obtain images with higher resolution, thereby being capable of greatly improving the viewing experience of users.

A flow chart of a method 200 for image processing according to an embodiment of the present disclosure will be described below with reference to FIG. 2.

At block 201, a first hidden vector in a first image may be extracted. As an example, in the present disclosure, an HVAE is an image processing system implemented based on the method provided in the present disclosure, and may include any one or more HVAEs from the HVAEs 105 to 107 in FIG. 1. The HVAE may be an image processing system capable of performing digital processing on input data such as images, and based on models such as a VAE model, a deep learning model, and a machine learning model, and the present disclosure does not have any limitation in this regard.

The HVAE may learn hidden vectors in an image and generate a new image based on the learned hidden vectors. In the present disclosure, the first image may be any low-resolution image that requires image super-resolution processing, and the present disclosure does not have any limitation in this regard. The first hidden vector extracted by the HVAE may include low-dimensional vectors used for characterizing high-dimensional image data, and may reflect data such as attributes or features of the image, for example, color, style, posture, and the like. The first hidden vector may further include both smoother and interpretable continuous hidden vectors and more sparse and diverse discrete hidden vectors.

At block 202, first grid data associated with the first image may be acquired, wherein the first grid data corresponds to pixel positions of the first image. For example, in some examples, in the first image whose size may be divided into m rows and n columns, each grid in the first grid data may correspond to pixel coordinates of each pixel in the first image. For example, the HVAE may record a pixel at the uppermost left corner position in the first image as (0,0) in the first grid data, and record a pixel at the lowermost right corner position in the image as (m−1, n−1) in the first grid data.

At block 203, the extracted first hidden vector may then be encoded to acquire first encoded data. By encoding the first hidden vector, further compression of the first hidden vector may be achieved, thereby preserving features and attributes sufficient to characterize the first image, reducing data redundancy and noise, and improving the efficiency and quality of data processing and analysis.

At block 204, first inference data may be generated based on the first grid data and the first encoded data. An inference module in the HVAE may perform inference processing on the input data to generate the first inference data. The present disclosure will describe the specific process of generating the first inference data below with reference to FIG. 4.

At block 205, the first inference data may be decoded to generate first decoded data. The decoding method may use various known and future developed decoding methods based on the needs of the processing tasks to be implemented, including but not limited to performing a series of deconvolution or up sampling layers on the first inference data, converting it into first decoded data with the same dimensions as the first image data, so that the first decoded data is as similar as possible to the first image data, while maintaining the distinguishability and controllability corresponding to each attribute or feature in the hidden vector. In some embodiments, the first decoded data may have missing detail information in the first image, for example, image high-frequency information such as hair, edges, and textures in the image.

Subsequently, at block 206, a second image may be generated based on the first decoded data and the first image. For example, in some embodiments, the HVAE may fill or modify the first image based on detail information in the first decoded data, thereby having the second image with a resolution higher than that of the first image.

A flow chart of the method for image processing in combination with an HVAE according to an embodiment of the present disclosure has been described above with reference to FIG. 2. The method implemented according to the present disclosure can achieve arbitrary and scalable image super-resolution processing in real time, explore potential correlations between images, and continuously improve image quality, thereby providing excellent image restoration quality while saving significant storage space and device costs. A schematic diagram illustrating use of an HVAE 300 in a method for image processing according to an embodiment of the present disclosure will be described below with reference to FIG. 3.

Figure 3:
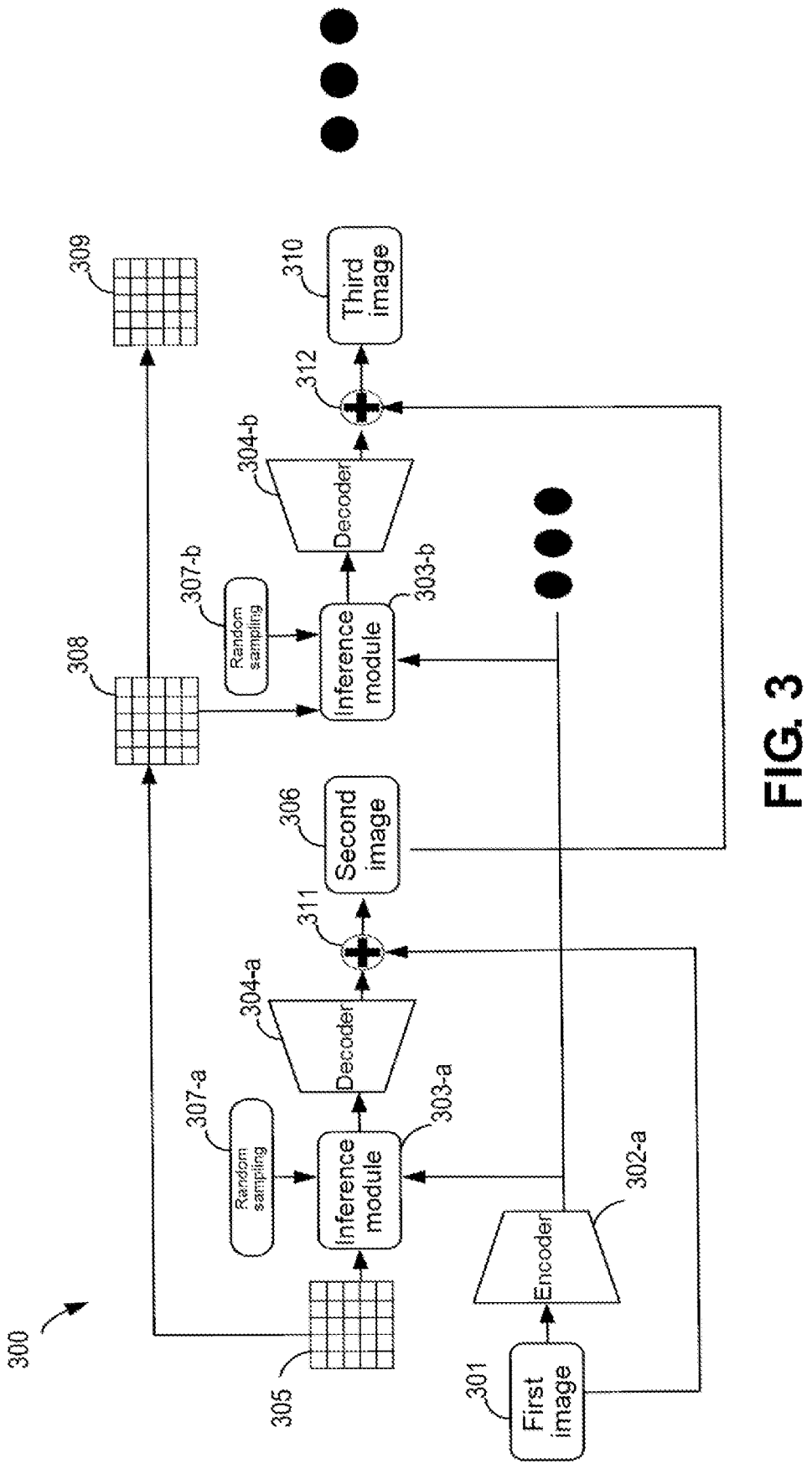
FIG. 3 illustrates a schematic diagram of a method for image processing using a hierarchical variational autoencoder according to an embodiment of the present disclosure.

As shown in FIG. 3, the HVAE 300 may be any one or a plurality of the HVAEs 105 to 107 in FIG. 1, and may include a first image 301, an encoder 302-a, an inference module 303-a, a decoder 304-a, first grid data 305, a random sampling module 307-a, a second image 306, second grid data 308, an inference module 303-b, a random sampling module 307-b, a decoder 304-b, a third image 310, third grid data 309, combination operations 311 and 312, and the like. It should be understood that the present disclosure does not limit the specific implementation of each element in the HVAE 300, and various known and future developed models or applications may be used based on the needs of a processing task to be implemented. Additionally or alternatively, the HVAE 300 may include other elements, including more or fewer elements than those illustrated in the embodiment of FIG. 3 of the present disclosure, and those skilled in the art can make various modifications to the HVAE 300 without departing from the scope of the present disclosure as described in the claims.

The first image 301 may be an image with arbitrary resolution, format, and content, and the present disclosure is not limited in this regard. The HVAE 300 may extract a first hidden vector in the first image 301, wherein the first hidden vector may be vector data used for characterizing the first image 301. The first hidden vector is then fed to the encoder 302-a of the HVAE 300 for encoding. The encoder 302-a may be any known image encoder.

As an example, in the present disclosure, the encoder 302-a may be an encoder based on the Enhanced Deep Residual Networks for Single Image Super-Resolution (EDSR) architecture, which uses a residual learning mechanism of a Res Net network to extract and reconstruct high-frequency details of an image through multi-layer residual blocks, and it further uses an L1 norm loss function and a multiscale up sampling model to optimize the network performance. In the present disclosure, the encoder 302-a may be used for feature extraction and expansion. The encoder 302-a then encodes the first hidden vector for generating first encoded data. The first encoded data may then be fed into the inference module 303-a for image inference.

In the HVAE 300, the first grid data 305 is data associated with the first image 301. The first grid data 305 may record coordinate information for each pixel position in the first image. The first grid data 305 may then be fed into the inference module 303-a for image inference.

In response to receiving the first encoded data and the first grid data 305, the inference module 303-a may perform image inference on the data to generate the first inference data. The first inference data may be data acquired by inference based on machine model learning and having more detail information and higher resolution information than the first image 301. For example, image high-frequency information such as hair, edges, textures, and the like may be included in the first inference data.

Alternatively or additionally, in some embodiments, random data from the random sampling module 307-a may further be added to the inference module 303-a to increase the randomness of the sampling and bring it closer to a ground truth value.

The first inference data may then be fed to the decoder 304-a for decoding to generate first decoded data. The decoding method may use various known and future developed decoding methods based on the needs of the processing task to be implemented, and the present disclosure does not have any limitation in this regard.

The HVAE 300 may then generate a second image 306 based on the first decoded data and the first image 301. For example, the HVAE 300 may combine 311 the first decoded data with the first hidden vector in the first image 301 to supplement the missing detail information in the first image 301, thereby generating the second image 306. The method of generating the second image 306 may use various known and future developed image generation methods based on the needs of the processing task to be implemented, and the present disclosure does not have any limitation in this regard.

The second image 306 may have higher resolution and/or detail information than the first image 301. For example, the first image 301 may be an image having a low resolution of 640×480 pixels, and the second image 306 may be an image having a high resolution of 4096×2160 pixels. Additionally or alternatively, the second image 306 may further include more edges and detail information than the first image 301.

If the second image 306 still does not meet the resolution of the device currently used by the user, for example, the second image 306 is an image having a resolution of 4K and the display has a resolution of 8K, the HVAE 300 may perform super-resolution processing on the second image 306. As an example, the HVAE 300 may first perform high-frequency encoding on the image using high-frequency information in the first grid data 305 to generate second grid data 308. For example, the HVAE 300 may use discrete cosine transform (DCT) to convert data from a spatial domain to a frequency domain, and then quantize and encode coefficients in the frequency domain to compress the size of image data while preserving edges and detail information of the image.

Alternatively or additionally, the HVAE 300 may use a high-pass filter to filter out low-frequency information and retain only high-frequency information, which can enhance the contrast and sharpness of the image. It should be understood that the high-frequency encoding method may use various known and future developed coding methods based on the needs of the processing task to be implemented, and the present disclosure does not have any limitation in this regard. Alternatively or additionally, the HVAE 300 may continue to perform high-frequency encoding on the second grid data 308 to generate third grid data 309.

The HVAE 300 may then input the second grid data 308, the first encoded data, and the random data from the random sampling module 307-b together into the inference module 303-b for another image inference. The inference module 303-b may perform image inference on the data to generate second inference data. The second inference data may be data acquired by inference based on machine model learning and having more detail information and higher resolution information than the second image 306. For example, the second inference data may contain more image high-frequency information such as hair, edges, and textures than the second image.

The second inference data may then be fed to the decoder 304-b for decoding to generate second decoded data. The decoding method may adopt various known and future developed decoding methods, and the present disclosure does not have any limitation in this regard. In FIG. 3, the decoder 304-b, the random sampling module 307-b, and the inference module 303-b may be the same modules as the decoder 304-a, the random sampling module 307-a, and the inference module 303-a, respectively, or they may be modules located in another HVAE in FIG. 1, and the present disclosure does not have any limitation in this regard.

The HVAE 300 may combine 312 the second decoded data with the second image to supplement the missing detail information in the second image, thereby generating a third image 310 with a higher resolution than the second image. This process may be iteratively repeated until a resolution that satisfies the user or adapts to the used terminal device is achieved.

Figure 4:
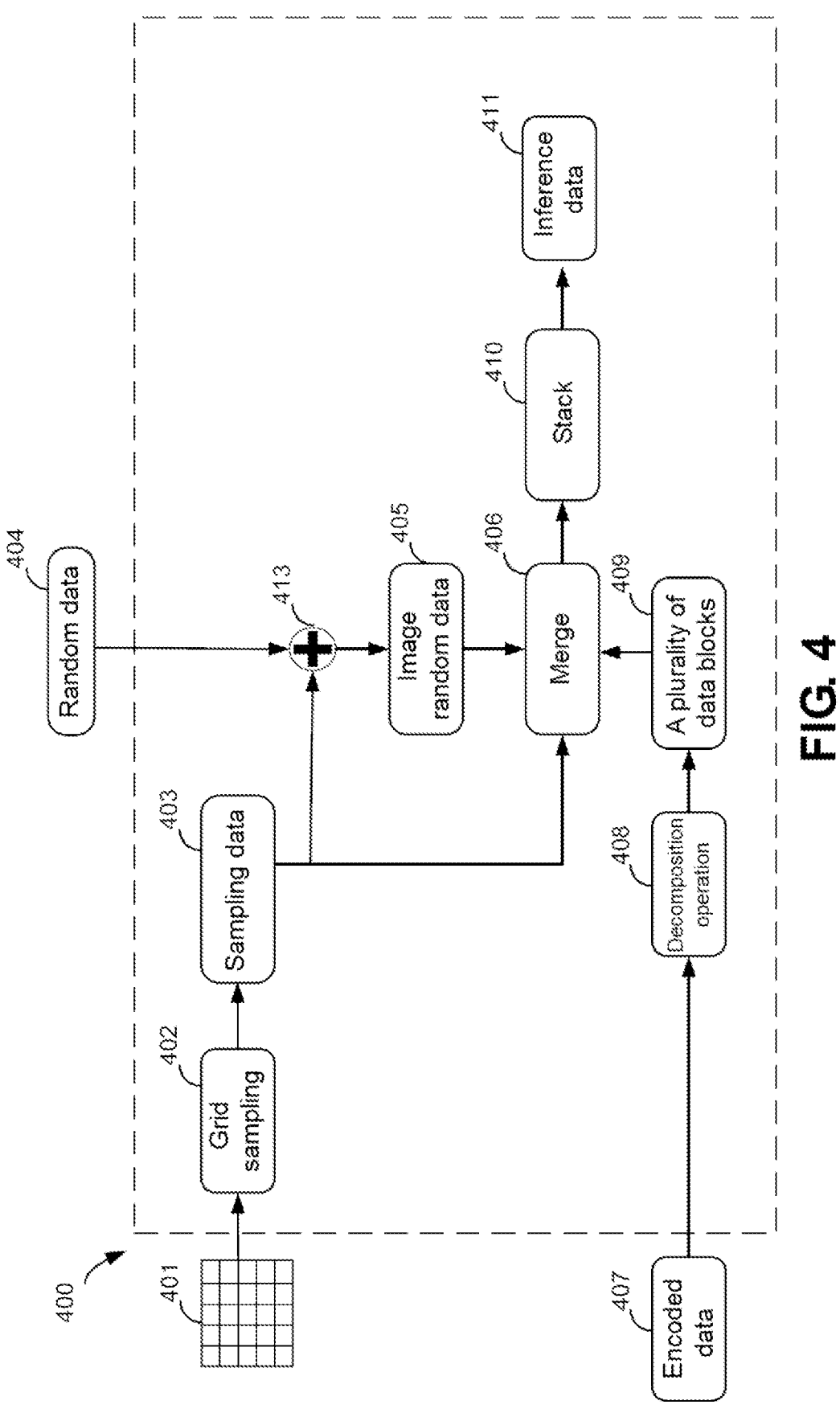
FIG. 4 illustrates a schematic diagram of a method for image processing using an image inference module according to an embodiment of the present disclosure.

A schematic diagram of a method for image processing using an image inference module 400 according to an embodiment of the present disclosure will be described below with reference to FIG. 4. The image inference module 400 may be any one or a plurality of the inference modules 303-a or 303-b in FIG. 3, and the present disclosure does not have any limitation in this regard. The image inference module 400 may first receive grid data 401 including the first grid data 305 and/or the second grid data 308, encoded data 407 generated by encoding the first image 301 by the encoder 302-a, and random data 404 via the random sampling module 307-a/307-b from, for example, FIG. 3.

Subsequently, the image inference module 400 may perform a grid sampling 402 operation on the grid data 401. The grid sampling 402 operation may include filling pixel values in the grid data 401 to a location specified by another grid to acquire sampling data 403. The sampling data 403 may be a two-dimensional location map that records relative pixel shifts from a high-resolution image to a low-resolution image to find paired pixel values from high-resolution image features. Alternatively or additionally, the method for grid sampling may further include methods such as bilinear sampling and nearest neighbor sampling, which are not limited in the present disclosure.

The image inference module 400 may then add 413 random data 404 to the sampling data 403 to further randomly sample the sampling data 403, thereby generating image random data 405, wherein the random data 404 may come from a random variable with a normal distribution.

The image inference module 400 may further perform a decomposition operation 408 on the encoded data 407, thereby expanding the encoded data 407 that is originally two-dimensional data into a plurality of data blocks 409 of the same size. This allows the HVAE to reconstruct an image based on data blocks rather than pixels. The decomposition operation 408 may be expressed by the following formula:

$$U(x, m, s, d) = \tag{2}$$
$$\text{Concat}\{x_{i,j}(i:i+m, j:j+m), i=0:s:H+2d, j=0:s:W+2d\}$$

wherein U represents the decomposition operation 408, x represents the input data, m represents the size of the data block, s represents the step size, d represents the filling size, concat represents the stacking operation, H represents the height of the first image, and W represents the width of the first image.

The image inference module 400 may then merge 406 the plurality of data blocks 409, the image random data 405, and the sampling data 403 to generate a plurality of merged data blocks, and each of the merged data blocks may have information about random data and sampling data. The image inference module 400 may stack 410 the generated plurality of merged data blocks to reassemble the originally one-dimensional merged data blocks into two-dimensional inference data 411. The inference data 411 may then be fed into a decoder for image super-resolution processing along with the first image.

The above has described a method of performing super-resolution processing on an image in combination with the trained HVAE of the present disclosure. However, it is required to train the HVAE before implementing the method described in the present disclosure. The process of training the HVAE will be described below with reference to FIG. 5 and FIG. 6.

Figure 5:
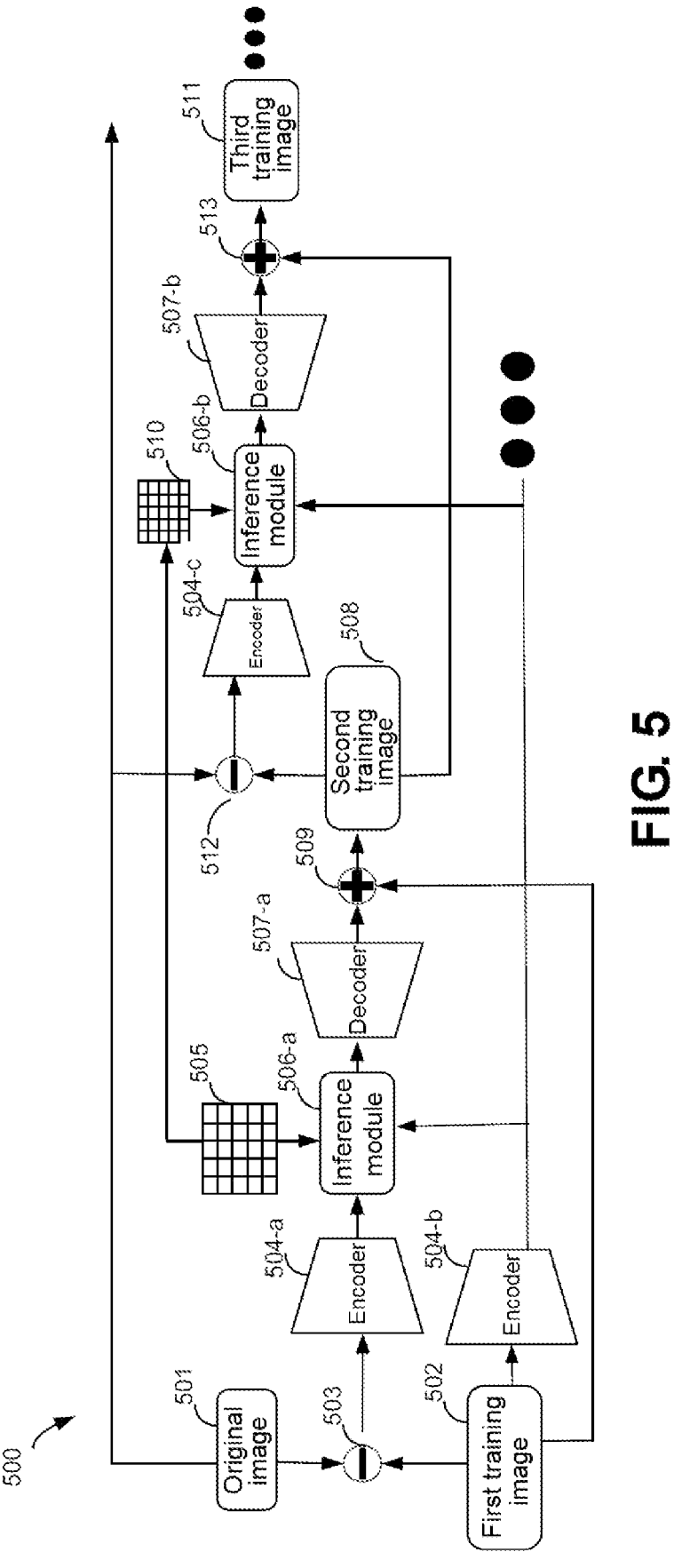
FIG. 5 illustrates a schematic diagram of a process for training a hierarchical variational autoencoder.

FIG. 5 illustrates a process of training the HVAE 500. The goal of training the HVAE is generating continuous representations for pixel based images. The continuous representation is expected to have infinite accuracy and may be rendered at any high resolution while maintaining high fidelity.

The HVAE 500 may be any one or a plurality of the HVAEs shown in FIG. 1 to FIG. 4. As shown in FIG. 5, when the HVAE 500 is trained, the HVAE 500 may first extract an original hidden vector from an original image 501 and a first training hidden vector from a first training image 502. The original image 501 may be an image with the same content as the first training image 502 but with a resolution higher than that of the first training image 502.

Subsequently, the HVAE 500 may subtract the original hidden vector from the first training hidden vector to acquire first residual data, and the first residual data may represent detail information such as edges and textures that are missing from the first training image 502 as compared with the original image 501. The first residual data may then be fed into an encoder 504-a for encoding to generate first residual encoded data. The first training hidden vector may also be fed into an encoder 504-b for encoding to generate first training encoded data. The encoder 504-a may be the same encoder as the encoder 504-b, and the present disclosure is not limited in this regard.

The HVAE 500 may further acquire first training grid data 505 associated with the first training image, and the first training grid data 505 corresponds to pixel positions of the first training image. Subsequently, the HVAE 500 inputs the first training grid data, the first training encoded data, and the first residual data into an inference module 506-a for generating first training inference data. A specific process of generating the first training inference data will be described below with reference to FIG. 6. The HVAE 500 may decode the first training inference data via a decoder 507-a to generate first training decoded data.

Finally, the HVAE 500 may generate a second training image 508 based on the first training decoded data and the first training image 502. For example, the HVAE 500 may combine 509 the first training decoded data with the first training hidden vector in the first training image 502 to supplement the missing detail information in the first training image 502, thereby generating the second training image 508.

If the second training image 508 still does not meet the resolution of the device currently used by the user, for example, the second training image 508 is an image having a resolution of 4K and the display has a resolution of 8K, this indicates that the second training image does not meet a resolution threshold required by the display device. The HVAE 500 may perform super-resolution processing training on elements such as the encoder 504-a/504-b, the inference module 506-a, the decoder 507-a, and the second training image 508. As an example, the HVAE 500 may first perform high-frequency encoding on image high-frequency information in the first training grid data 505 to generate second training grid data 510. The HVAE 500 may extract a second training hidden vector of the second training image 508.

The HVAE 500 may then subtract 512 the original hidden vector from the second training hidden vector to acquire second residual data, and the second residual data may represent detail information such as edges and textures that are missing from the second training image 508 as compared with the original image 501. The second residual data may then be fed into an encoder 504-c for encoding to generate second residual encoded data. The encoder 504-c may be an encoder the same as or different from the encoder 504-a/504-b, and the present disclosure is not limited in this regard.

The HVAE 500 may then input the second training grid data 510, the first training encoded data, and the second residual encoded data together into an inference module 506-b for performing another image inference. The inference module 506-b may perform image inference on the data to generate second training inference data. The second training inference data may be data acquired by inference based on machine model learning and having more detail information and higher resolution information than the second training image 508. The inference module 506-b may be an encoder the same as or different from the inference module 506-a, and the present disclosure is not limited in this regard.

The second training inference data may then be fed to a decoder 507-b for decoding to generate second training decoded data. The decoding method may adopt various known and future developed decoding methods, and the present disclosure does not have any limitation in this regard. The decoder 507-b may be a decoder the same as or different from the decoder 507-a, and the present disclosure is not limited in this regard.

The HVAE 500 may combine 513 the second training decoded data with the second training image to supplement the missing detail information in the second training image, thereby generating a third training image 511 with a higher resolution than the second image. The training process may be iteratively repeated until a resolution that satisfies the user or adapts to the used terminal device is generated. For example, in some embodiments, if the generated training image is lower than the resolution threshold, such as 1080P and 4K, of the used terminal device, the HVAE may repeat the above training process for the encoder, the decoder, the inference module, and other elements therein to further optimize their processing capabilities for edge details and the like. If the generated training image meets or is higher than the resolution threshold of the used terminal device, the HVAE may stop training elements such as the encoder, the decoder, and the inference module.

In some embodiments, in order to quantitatively evaluate the effectiveness of the learned continuous representation, in addition to evaluating an up sampling task at the mesoscale of the training distribution, the HVAE 500 may further evaluate an oversized up sampling scale beyond the training distribution. Specifically, during the training time, uniform sampling is performed within a range of 1 to 4 times (continuous range) for the up sampling scale. In the using process, the HVAE 500 may perform evaluation on previously unseen images that have higher up sampling scales, that is, scales not seen during training, such as 6 times to 30 times. Out-of-distribution tasks may evaluate whether continuous representations may be generalized to arbitrary accuracy.

In some embodiments, the HVAE 500 may use 48×48 image blocks as inputs to the encoder. With B representing the batch size, the HVAE 500 may first sample B random scales $r_{1-B}$ with a uniform distribution of U(1,4), and then the HVAE 500 may cut B image blocks at the size of $48_{r_i} \times r_{t=1}^B$ from the first training image 502. The 48×48 image blocks are their under sampling counterparts. For ground truths such as the original image 501, the HVAE 500 may convert these images into pixel samples (coordinate RGB pairs), and $48^2$ pixel samples are sampled for each of these images, so that shapes of the ground truths in the same batch are the same.

Figure 6:
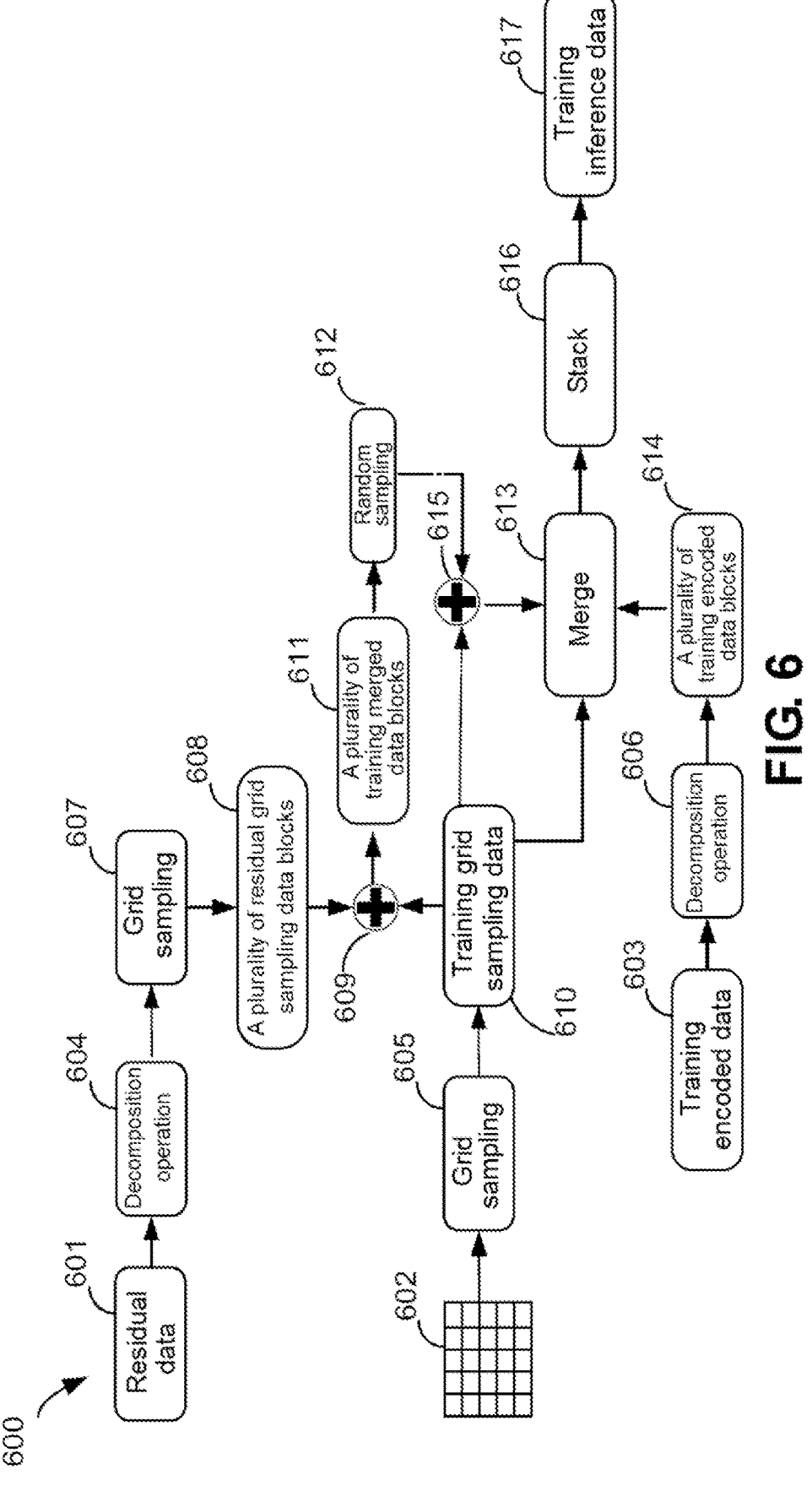
FIG. 6 illustrates a schematic diagram of a process for training an image inference module in a hierarchical variational autoencoder.

FIG. 6 illustrates a schematic diagram of a process of training an image inference module 600 in the HVAE. The image inference module 600 may be located in any one or a plurality of the HVAEs shown in FIG. 1 to FIG. 5.

To train the network, each image inference module 600 is configured to learn a generation model for the original image that may be represented as p(z, y|x)=N~(z; μ(y|x), Σ(y|x)) by a Gaussian sampling model. The key to this process is a Latent space Grid Sampling process (LGS). The overall idea is to learn the graphics of the original image, so that the HVAE can learn continuous potential spatial interpolation through grid sampling. To extract features from an image, traditional methods use 2D convolution processing to compress the image into dense and smaller 2D feature maps. However, a great amount of coordinate information is discarded, and it is difficult to create graphical connections. The LGS may be described by the following process performed by the image inference module 600, and grid sampling and conditional graphical modeling may be implemented by performing the process.

The image inference module 600 may first receive residual data 601 acquired by subtracting the hidden vector of the original image 501 in, for example, FIG. 5 from the first training image 502, training grid data 602 including the first training grid data 505 and/or the second training grid data 510, and training encoded data 603 generated by encoding the first training image 502 by the encoder 504-*a*.

The image inference module 600 may then perform a decomposition operation 604 on the residual data 601, thereby expanding the residual data 601 that is originally two-dimensional data into two or more residual encoded data blocks of the same size. The image inference module 600 may then perform grid sampling 607 to generate a plurality of residual grid sampling data blocks 608. Subsequently, the image inference module 600 may perform a grid sampling operation 605 on the training grid data 602 to acquire training grid sampling data 610.

The image inference module 600 may then combine 609 the plurality of residual grid sampling data blocks 608 with the training grid sampling data 610 to generate a plurality of training merged data blocks 611. The image inference module 600 may acquire an average μ and a variance σ of the plurality of training merged data blocks 611, and introduce random data ε from a normal distribution to perform random sampling 612 to acquire a plurality of image random data blocks z=μ+σε. In some embodiments, the plurality of pieces image random data may further be combined 615 with the training grid sampling data 610. At the same time, the image inference module 600 may perform a decomposition operation 606 on the training encoded data 603 to generate a plurality of training encoded data blocks 614.

The image inference module 600 may then perform a merge operation 613 on the plurality of image random data blocks, the plurality of training encoded data blocks 614, and the training grid sampling data 610. Each merged data block may contain information about random data and grid sampling data. The image inference module 600 may stack

616 the generated plurality of merged data blocks to reassemble the originally one-dimensional merged data blocks into two-dimensional training inference data 617. The training inference data 617 may then be fed into a decoder for image super-resolution training processing along with the first image.

In the traditional variational autoencoder (VAE) image super-resolution processing process, input image data x∈X is given, the VAE uses an encoder (represented by Q and having a learnable parameter φ) and a decoder (represented by P and having a learnable parameter θ) to maximize an evidence lower bound (ELBO) of a data likelihood, and $\mathbb{E}_z$ represents the expectation of the hidden vector, and may be expressed as:

$$L^{ELBO} = \mathbb{E}_{z \sim Q(z|x)}[\log P_\theta(x|z)] - D_{KL}[Q_\phi(z|x)\|P(z)] \le \log P_\theta(x) \quad (3)$$

The maximization of the ELBO is determined by two items. The first term is a reconstruction item, where the hidden vector z is given, and the VAE may optimize the decoder to generate the best reconstructed data sample. The second term is regularization, which uses a Kullback-Leibler (KL) divergence to constrain the encoder by encouraging an approximate posterior Q(z|x) to match a prior P(z). However, the ELBO does not guarantee that points outside the support of $P_{x-X}$ will not be given a high likelihood.

In some embodiments of the present disclosure, an original image feature map may be modeled by adding a grid parameter e and an image feature y, and may be represented as:

$$L^{ELBO} = \mathbb{E}_{z \sim Q(z|y,e)}[\log P_\theta(y, e|z)] - D_{KL}[Q_\phi(z|y, e)\|P(z)] \le \log P_\theta(y, e) \quad (4)$$

This formula acquires the hidden vector distribution of the original image, but does not provide strong supervision for conditional low-resolution images. More importantly, it does not explore a relationship between an original image feature and a coordinate grid. Combining Formula (1) and Formula (4), the method implemented by image inference module 600 in the present disclosure may be represented by the following formula:

$$L_t^{ELBO} = \mathbb{E}_{z \sim Q(z|y_t - x, e_i)}[\log P_\theta(y_t - x, e_i|z)] - \quad (5)$$
$$D_{KL}[Q_\phi(z|y_t - x, e_i)\|P(z)] \le \log P_\theta(y, e)$$
$$e_0 = e, \ e_t = \beta(e, t), \ t = 1, 2, \dots, T$$
$$\beta(e, t) = (\sin(2^{t-1}\pi e), \cos(2^{t-1}\pi e))$$

wherein t represents the t-th stage of training and/or use. Each stage learns some information towards a final result. In the t-th stage, the present disclosure may model graphics of an original image to the t order of its grid sampling. That is, the present disclosure may use low-frequency/high-frequency coordinate encoding to expand the original grid to its t-th order (sin, cos) frequency band. The method is based on the concept of a neural tangent kernel (NTK). Embedding coordinates into a multidimensional space may avoid a "spectral bias" and force the network to slowly decay in a high-frequency domain.

Figure 7:
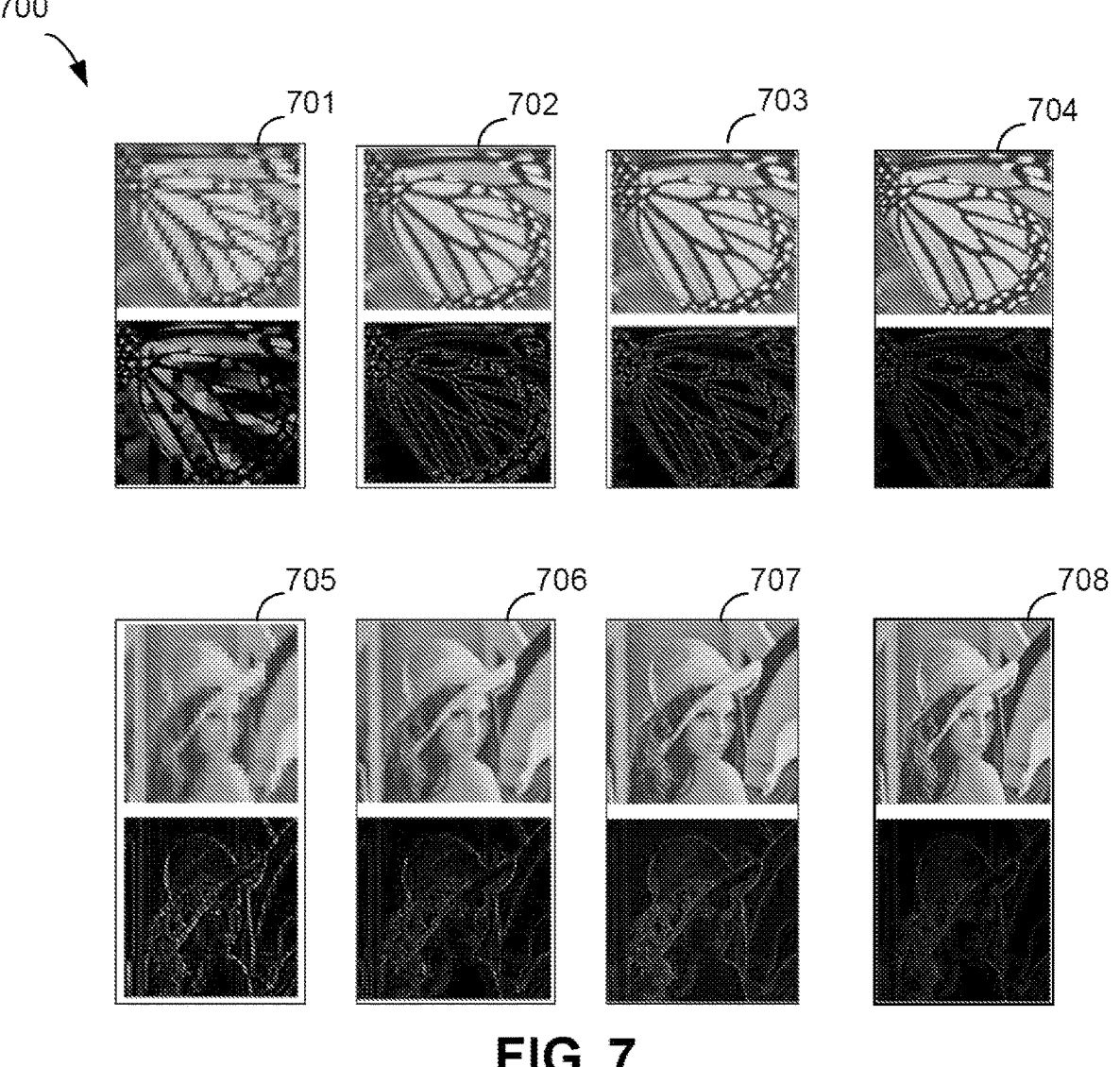
FIG. 7 illustrates a corresponding experimental effect diagram of performing super-resolution processing of a plurality of low-resolution images using a hierarchical variational autoencoder.

FIG. 7 illustrates a corresponding experimental effect diagram 700 of performing super-resolution processing on a plurality of low-resolution images using an HVAE implemented according to the present disclosure. Blocks 701 and 705 illustrate low-resolution images and residuals between hidden vectors of these images and a hidden vector of the original high resolution image, respectively. Blocks 702 to 704 and blocks 706 to 708 respectively illustrate intermediate result graphs of performing image super-resolution processing using the HVAE on low-resolution images, and the residuals between the hidden vectors of these images and the hidden vector of the original high-resolution image. It may be found that the method implemented according to the present disclosure may gradually restore missing information, especially in edge regions, and details of the image itself become sharper and more abundant.

Figure 8:
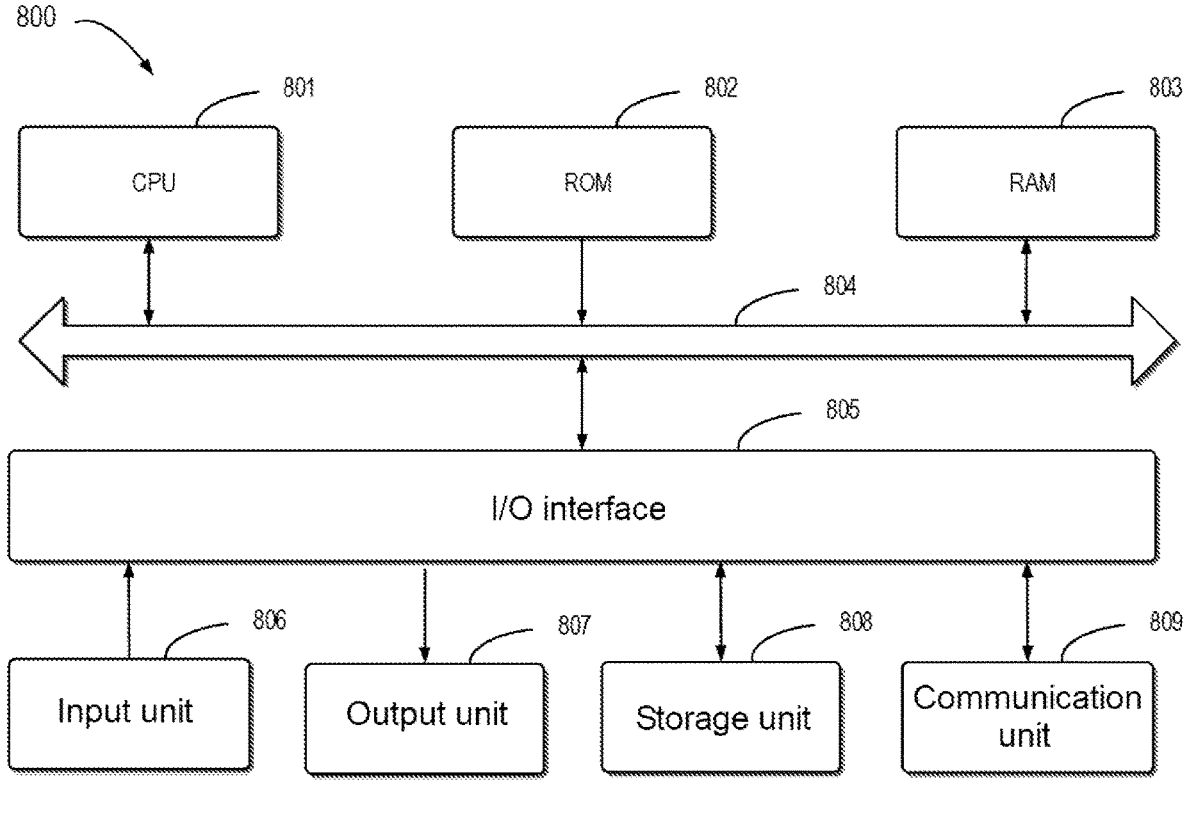
FIG. 8 illustrates a block diagram of an example device suitable for implementing embodiments of the present disclosure.

FIG. 8 is a block diagram of an example device 800 that can be used to implement an embodiment of the present disclosure. A computing device in FIG. 1 may be implemented using the device 800. As shown in the figure, the device 800 includes a central processing unit (CPU) 801, which may execute various appropriate actions and processing according to computer program instructions stored in a read-only memory (ROM) 802 or computer program instructions loaded from a storage unit 808 onto a random access memory (RAM) 803. Various programs and data required for the operation of the device 800 may also be stored in the RAM 803. The CPU 801, the ROM 802, and the RAM 803 are connected to each other through a bus 804. An input/output (I/O) interface 805 is also connected to the bus 804.

A plurality of components in the device 800 are connected to an I/O interface 805, including: an input unit 806, such as a keyboard and a mouse; an output unit 807, such as various types of displays and speakers; a storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The various processes and processing described above, such as the method 200, may be performed by a CPU 801. For example, in some embodiments, the method 200 may be implemented as a computer software program that is tangibly included in a machine-readable medium, such as the storage unit 808. In some embodiments, part or all of the computer program may be loaded and/or installed onto the device 800 via the ROM 802 and/or the communication unit 809. When the computer program is loaded into the RAM 803 and executed by the CPU 801, one or more actions of the method 200 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for image processing, comprising:
extracting a first hidden vector in a first image;

acquiring first grid data associated with the first image, wherein the first grid data corresponds to pixel positions of the first image;
encoding the first hidden vector to acquire first encoded data;
generating first inference data based on the first grid data and the first encoded data, wherein the first inference data is generated at least in part utilizing first sampling data obtained by grid sampling the first grid data in combination with random data obtained from random sampling;
decoding the first inference data to generate first decoded data; and
generating a second image based on the first decoded data and the first image, the second image having a higher resolution than the first image;
wherein generating the first inference data based on the first grid data and the first encoded data comprises:
adding the random data from the random sampling to the first sampling data to generate first image random data;
decomposing the first encoded data into a plurality of first data blocks;
merging the plurality of first data blocks, the first sampling data, and the first image random data to generate a plurality of first merged data blocks; and
stacking the plurality of first merged data blocks to form the first inference data.

2. The method according to claim 1, further comprising:
high-frequency encoding the first grid data to generate second grid data, the second grid data having high-frequency data in the first grid data;
generating second inference data based on the second grid data and the first encoded data;
decoding the second inference data to generate second decoded data; and
generating a third image based on the second decoded data and the second image, the third image having a higher resolution than the second image.

3. The method according to claim 1, further comprising performing a training process, the training process comprising:
extracting an original hidden vector of an original image;
extracting a first training hidden vector of a first training image, wherein the original image is associated with the first training image, and the original image has a higher resolution than the first training image;
acquiring first training grid data associated with the first training image, wherein the first training grid data corresponds to pixel positions of the first training image;
calculating first residual data between the original hidden vector and the first training hidden vector;
encoding the first residual data to generate first residual encoded data;
encoding the first training hidden vector to acquire first training encoded data;
generating first training inference data based on the first training grid data, the first training encoded data, and the first residual data;
decoding the first training inference data to generate first training decoded data; and
generating a second training image based on the first training decoded data and the first training image, the second training image having a higher resolution than the first training image.

4. The method according to claim 3, wherein the training process further comprises:

extracting a second training hidden vector of the second training image;

calculating second residual data between the original hidden vector and the second training hidden vector;

encoding the second residual data to generate second residual encoded data;

high-frequency encoding the first training grid data to generate second training grid data, the second training grid data having high-frequency data in the first training grid data;

generating second training inference data based on the second training grid data, the first training encoded data, and the second residual encoded data;

decoding the second training inference data to generate second training decoded data; and generating a third training image based on the second training decoded data and the second training image, the third training image having a higher resolution than the second training image.

5. The method according to claim 3, wherein generating first training inference data based on the first training grid data, the first training encoded data, and the first residual data comprises:

grid sampling the first training grid data to generate first training grid sampling data;

decomposing the first residual encoded data into a plurality of first residual encoded data blocks;

sampling the plurality of first residual encoded data blocks to generate a plurality of first residual encoded sampling data blocks;

merging the first training grid sampling data with the plurality of first residual encoded sampling data blocks to generate a plurality of first training merged data blocks; and adding random data from random sampling to the plurality of first training merged data blocks to generate a plurality of first image random data blocks.

6. The method according to claim 5, further comprising:

decomposing the first training encoded data into a plurality of first training encoded data blocks; and combining and stacking the plurality of first image random data blocks, the plurality of first training encoded data blocks, and the first training grid sampling data to form the first training inference data.

7. The method according to claim 5, further comprising:

generating the first training encoded data by an encoder;

generating the first training inference data by an inference module;

generating the first training decoded data by a decoder;

comparing image resolution of the second training image with that of the original image to acquire an image resolution result;

performing the training process on the encoder, the inference module, and the decoder in response to the image resolution result being lower than a resolution threshold; and stopping the training process for the encoder, the inference module, and the decoder in response to the image resolution result being higher than the resolution threshold.

8. The method according to claim 1, further comprising:

decomposing the first encoded data into the plurality of first data blocks of a same size based on a length of the first encoded data.

9. An electronic device, comprising:

at least one processor; and memory coupled to the at least one processor and having instructions stored therein, wherein the instructions, when executed by the at least one processor, cause the electronic device to perform actions comprising:

extracting a first hidden vector in a first image;

acquiring first grid data associated with the first image, wherein the first grid data corresponds to pixel positions of the first image;

encoding the first hidden vector to acquire first encoded data;

generating first inference data based on the first grid data and the first encoded data, wherein the first inference data is generated at least in part utilizing first sampling data obtained by grid sampling the first grid data in combination with random data obtained from random sampling;

decoding the first inference data to generate first decoded data; and generating a second image based on the first decoded data and the first image, the second image having a higher resolution than the first image;

wherein generating the first inference data based on the first grid data and the first encoded data comprises:

adding the random data from the random sampling to the first sampling data to generate first image random data;

decomposing the first encoded data into a plurality of first data blocks;

merging the plurality of first data blocks, the first sampling data, and the first image random data to generate a plurality of first merged data blocks; and stacking the plurality of first merged data blocks to form the first inference data.

10. The electronic device according to claim 9, wherein the actions further comprise:

high-frequency encoding the first grid data to generate second grid data, the second grid data having high-frequency data in the first grid data;

generating second inference data based on the second grid data and the first encoded data;

decoding the second inference data to generate second decoded data; and generating a third image based on the second decoded data and the second image, the third image having a higher resolution than the second image.

11. The electronic device according to claim 9, wherein the actions further comprise performing a training process, the training process comprising:

extracting an original hidden vector of an original image;

extracting a first training hidden vector of a first training image, wherein the original image is associated with the first training image, and the original image has a higher resolution than the first training image;

acquiring first training grid data associated with the first training image, wherein the first training grid data corresponds to pixel positions of the first training image;

calculating first residual data between the original hidden vector and the first training hidden vector;

encoding the first residual data to generate first residual encoded data;

encoding the first training hidden vector to acquire first training encoded data;

generating first training inference data based on the first training grid data, the first training encoded data, and the first residual data;

decoding the first training inference data to generate first training decoded data; and generating a second training image based on the first training decoded data and the first training image, the second training image having a higher resolution than the first training image.

12. The electronic device according to claim 11, wherein the training process further comprises:

extracting a second training hidden vector of the second training image;

calculating second residual data between the original hidden vector and the second training hidden vector;

encoding the second residual data to generate second residual encoded data;

high-frequency encoding the first training grid data to generate second training grid data, the second training grid data having high-frequency data in the first training grid data;

generating second training inference data based on the second training grid data, the first training encoded data, and the second residual encoded data;

decoding the second training inference data to generate second training decoded data; and generating a third training image based on the second training decoded data and the second training image, the third training image having a higher resolution than the second training image.

13. The electronic device according to claim 11, wherein generating first training inference data based on the first training grid data, the first training encoded data, and the first residual data comprises:

grid sampling the first training grid data to generate first training grid sampling data;

decomposing the first residual encoded data into a plurality of first residual encoded data blocks;

sampling the plurality of first residual encoded data blocks to generate a plurality of first residual encoded sampling data blocks;

merging the first training grid sampling data with the plurality of first residual encoded sampling data blocks to generate a plurality of first training merged data blocks; and adding random data from random sampling to the plurality of first training merged data blocks to generate a plurality of first image random data blocks.

14. The electronic device according to claim 13, wherein the actions further comprise:

decomposing the first training encoded data into a plurality of first training encoded data blocks; and combining and stacking the plurality of first image random data blocks, the plurality of first training encoded data blocks, and the first training grid sampling data to form the first training inference data.

15. The electronic device according to claim 13, wherein the actions further comprise:

generating the first training encoded data by an encoder;

generating the first training inference data by an inference module;

generating the first training decoded data by a decoder;

comparing image resolution of the second training image with that of the original image to acquire an image resolution result;

performing the training process on the encoder, the inference module, and the decoder in response to the image resolution result being lower than a resolution threshold; and stopping the training process for the encoder, the inference module, and the decoder in response to the image resolution result being higher than the resolution threshold.

16. The electronic device according to claim 9, wherein the actions further comprise:

decomposing the first encoded data into the plurality of first data blocks of a same size based on a length of the first encoded data.

17. A computer program product comprising a non-transitory computer-readable medium storing machine-executable instructions, wherein the machine-executable instructions, when executed by a machine, cause the machine to perform actions comprising:

extracting a first hidden vector in a first image;

acquiring first grid data associated with the first image, wherein the first grid data corresponds to pixel positions of the first image;

encoding the first hidden vector to acquire first encoded data;

generating first inference data based on the first grid data and the first encoded data, wherein the first inference data is generated at least in part utilizing first sampling data obtained by grid sampling the first grid data in combination with random data obtained from random sampling;

decoding the first inference data to generate first decoded data; and generating a second image based on the first decoded data and the first image, the second image having a higher resolution than the first image;

wherein generating the first inference data based on the first grid data and the first encoded data comprises:

adding the random data from the random sampling to the first sampling data to generate first image random data;

decomposing the first encoded data into a plurality of first data blocks;

merging the plurality of first data blocks, the first sampling data, and the first image random data to generate a plurality of first merged data blocks; and stacking the plurality of first merged data blocks to form the first inference data.

18. The computer program product according to claim 17, wherein the actions further comprise:

high-frequency encoding the first grid data to generate second grid data, the second grid data having high-frequency data in the first grid data;

generating second inference data based on the second grid data and the first encoded data;

decoding the second inference data to generate second decoded data; and generating a third image based on the second decoded data and the second image, the third image having a higher resolution than the second image.

* * * * *